United States Patent [19]

Hoffmann

[11] 4,122,940
[45] Oct. 31, 1978

[54] APPARATUS FOR THE WEIGHING OF MASS PRODUCED ARTICLES

[75] Inventor: Wilhelm Hoffmann, Schwarbisch Hall, Fed. Rep. of Germany

[73] Assignee: Optima-Maschinenfabrik, Dr. Buehler KG, Fed. Rep. of Germany

[21] Appl. No.: 738,503

[22] Filed: Nov. 3, 1976

[30] Foreign Application Priority Data

Nov. 3, 1975 [DE] Fed. Rep. of Germany ....... 2548988

[51] Int. Cl.² .......................................... B65G 69/00
[52] U.S. Cl. ................................... 198/504; 177/50; 65/160
[58] Field of Search .............. 198/457, 476, 504, 505, 198/597, 606, 721, 461, 575–577; 177/50, 120; 214/2; 65/29, 160–164; 34/20; 432/77; 15/301

[56] References Cited

U.S. PATENT DOCUMENTS

| | | | |
|---|---|---|---|
| 2,319,908 | 5/1943 | Walter | 198/504 |
| 2,912,093 | 11/1959 | Lauck | 198/597 |
| 3,085,640 | 4/1963 | Allen | 198/505 |
| 3,166,181 | 1/1965 | Rutkus et al. | 198/457 |
| 3,190,381 | 6/1965 | Eberhardt et al. | 198/505 |
| 3,452,855 | 7/1969 | Baker et al. | 198/461 |
| 3,719,267 | 3/1973 | Reist et al. | 198/577 |

FOREIGN PATENT DOCUMENTS 368,335  3/1932  United Kingdom ....................... 65/160

*Primary Examiner*—Joseph E. Valenza
*Attorney, Agent, or Firm*—J. Rodman Steele, Jr.

[57] ABSTRACT

An apparatus for the weighing of mass produced articles, especially highly-tempered glass products shortly after their formation, which are transferred with the interposing of a balancing device, by means of a weighing conveyor belt from a delivery conveyor belt on to a removal conveyor belt which runs at an angle to the delivery conveyor belt. The apparatus aids quality control by monitoring article weight. It operates dependably even in dirty, turbulent, high temperature environments.

17 Claims, 4 Drawing Figures

APPARATUS FOR THE WEIGHING OF MASS PRODUCED ARTICLES

BACKGROUND OF THE INVENTION

From the German public document No. 2,138,747, a kind of weighing device has become well known in which one or several scales run around on a continuous track which constitutes a part of the conveyor line. This track can be shaped according to the known layout, like a carousel or like a hanging conveyor. In the carousel-like layout it is provided with several scales, and a transfer conveyor is provided which pushes the products from the delivery conveyor onto the carousel, while another transfer conveyor transfers the products from the carousel onto the removal belt conveyor.

The apparatus requires a large number of scales which, especially with highly-tempered and/or dirt-shedding products, are endangered with respect to their operation due to their direct contact with these products. The kind of transfer as well as the necessity of placing the products exactly on the scales are difficult to carry out, especially if the mass produced articles do not arrive on the conveyor in an exact sequence.

In this public document, it is further explained that it is known how to use belt scales with a weighing belt which, for example, can be formed as a gridiron. However, it is also explained there, that with such belt scales, the weighing of relatively light mass produced articles of high temperature with the required precision is impossible.

In the present invention, however, the weighing device is arranged in the angle formed between the conveyor belts. It has a weighing belt driven by and carried by a weighing cell. A transfer conveyor extends over both conveyor belts and the weighing belt. The delivery conveyor is preferably the removal conveyor of an automatic glass-blowing machine and the removal conveyor is preferably the delivery conveyor that belongs to the cooling oven. Between these, a transfer is necessary in any case, so that no additional complication of the transport procedure results because of the weighing procedure. Especially with automatic glass-blowing machines, constant precise weight check is necessary because the feed of glass drops to the molds changes in the course of the operation. Since the glass molds determine only the outer shape, the thickness of the walls and the capacity of the containers vary in size. That can lead to unallowably great variances in the filling amount when the bottles are later filled, and further, it is not possible to make relatively thin-walled bottles without endangering the shatter-index.

The precise weight check is needed in order to be able to subsequently regulate the glass feeder unit of the automatic machine as a function of the bottle weights. Previously all the attempts to make a precise and reliable weighing device failed, because the extreme environmental (temperatures in the neighborhood of red-heat, strong air turbulences and extreme dirtiness) have hindered them. It has turned out, however, that these problems can be solved by means of the device and assembly in accordance with the invention.

The weighing apparatus can then be arranged in a closed housing, out of which the weighing belt extends from the side. The weighing apparatus which stands in the angle formed between the two conveyor belts, which is not normally used in the rest of the operation can therefore be built sufficiently large and can be enclosed by a housing advantageously insulated and provided with a high pressure ventilation.

BRIEF SUMMARY OF THE INVENTION

It is an object of the present invention to create a weighing apparatus for mass produced articles which can weigh the mass produced articles dependably and precisely in quick succession, without risking the danger of conveyor interruption in the output of the products.

It is another object of the present invention to create a weighing apparatus for mass produced articles which reduces the marring of said articles by contacting said articles for only a very short period of time.

It is still another object of the present invention to create a weighing apparatus for mass produced articles which is useful for making occasional spot checks.

It is yet another object of the present invention to create a weighing apparatus for mass produced articles which can operate with great dependability even in a very dirty, very turbulent atmosphere and with mass produced articles of high temperature.

It is yet another object of the present invention to create a weighing apparatus for mass produced articles which can be easily engaged and disengaged without interrupting production of said articles.

It is yet another object of the present invention to create a weighing apparatus for mass produced articles which initiates command impulses to the production machinery without the use of photocell scanning.

In brief, the weighing device of the present invention is arranged in the angle formed between the conveyor belts which carry the articles from the production machinery, normally a high temperature environment, to suitable cooling chambers. It has a weighing belt driven by and carried by a weighing cell. A transfer conveyor extends over both conveyor belts and the weighing belt. The delivery conveyor is preferably the removal conveyor of an automatic glass-blowing machine and the removal conveyor is preferably the delivery conveyor that belongs to the cooling-oven. Between these, a transfer is necessary in any case, so that no additional complication of the transport procedure results because of the weighing procedure. Especially with automatic glass-blowing machines, constant precise weight check is necessary because the feed of glass drops to the molds changes in the course of the operation. Since the glass molds determine only the outer shape, the thickness of the walls and the capacity of the containers vary in size. That can lead to unallowably great variances in the filling amount when the bottles are later filled, and further, it is not possible to make relatively thin-walled bottles without endangering the shatter-index.

The precise weight check is needed in order to be able to subsequently regulate the glass feeder unit of the automatic machine as a function of the bottle weights. Previously all the attempts to make a precise and reliable weighing device failed, because the extreme environmental conditions (temperatures in the neighborhood of red-heat, strong air turbulences and extreme dirtiness) have hindered them. It has turned out, however, that these problems can be solved by means of the device and assembly in accordance with the invention.

The transfer conveyor can at least be a finger-chain conveyor. This can usually have a vertical turning axis. For certain uses, especially when the products travel in several parallel rows, it can, however, be advantageous to set up additional or exclusive finger-chain conveyors with horizontal turning axes.

To advantage, the conveying direction of the weighing belt can run away from the transfer conveyor at an angle to the direction of the motion of the transfer conveyor. At the start of the transfer, the product is adjacent to the transfer conveyor. Then while it is standing on the weighing belt, it is nevertheless moved away in the conveying direction of the weighing belt which diverges from the direction of motion of the transfer conveyor, so that it stands freely on the weighing belt for weighing. Also, in order that the product becomes free of the transfer unit of the transfer conveyor which element operates in the direction of transport, for example, the finger of the finger chain conveyor, it is advantageous if the weighing belt operates at a faster rate than the transfer conveyor. When it leaves the weighing belt, the finger then catches the product again and transfers it onto the removal conveyor belt.

The arrangement as described has the special advantage that the transfer conveyor can be movable from its position which feeds on the weighing belt, into a position in which it conducts the objects directly from the delivery to the removal conveyor belt, if necessary by interposing a conducting segment. For this, it is normally only necessary to swivel the finger-chain conveyor back a little in the conveying direction of the removal conveyor belt and to provide a corresponding conducting plate. Thereby the scales can be put out of service without interrupting the operation if it is not necessary in exceptional cases or if a trouble must be eliminated.

When the product runs onto the weighing belt, the weighing process begins in the form of a vibrating sample, which produces a corresponding oscillating electric weighing signal. This signal should be stopped when the vibrating is ended, that is, usually shortly before the product leaves the weighing belt. Since, under certain conditions, the red-hot products cause difficulties during scanning by means of photocells, a special advantage of the arrangement according to the invention results when a signal source for the production of a cease impulse for the weighing signal works together with the finger-chain conveyor. The position of the fingers of the finger-chain conveyor is a definite function of the position of the product on the weighing belt, especially since the speed differentials between the weighing belt and the finger-chain conveyor are held at a constant value. It is possible with this to have the signal source be operated either by the fingers of the finger-chain conveyor which are normally arranged at a constant spacing or by other spots. Thereby this signal source can be set up outside the area of the products, red-hot under certain conditions.

The arrangement according to the invention makes it possible, further advantageously, that the weighing belt runs on floating shafts supported loosely in bushings. The weighing apparatus can then be arranged in a closed housing, out of which the weighing belt extends from the side. The weighing apparatus which stands in the angle formed between the two conveyor belts, which is not normally used in the rest of the operation can therefore be built sufficiently large and can be enclosed by a housing advantageously insulated and provided with a high pressure ventilation.

The weighing cells and the driving motor for the weighing are thereby not exposed to high temperatures and dirt. Another contribution is that the housing can be constructed to advantage with double walls; the hollow space in the double wall is ventilated. The high pressure ventilation can have its exhaust at the shaft holes so that dirt intake is mitigated against.

Further it is possible to choose a construction of the weighing device which is conducive to a belt scale that works sufficiently dependably even under these extreme conditions, in that the motor that drives the weighing belt is arranged on the opposite side of the weighing cell from the weighing belt on an arch-like support. By this means it is possible completely to balance the considerable weight of the weighing belt, which is to be vigorously operated, on the one hand and of the driving motor on the other, so that the weighing cell does not have to absorb any rocking force. For this reason, it is also possible to weigh lighter products on such an apparatus. The driving shafts for the weighing belt can be led past the weighing cell on the side.

BRIEF DESCRIPTION OF THE DRAWINGS

For the purpose of illustrating the invention, there are shown in the drawings forms which are presently preferred; it being understood, however, that this invention is not limited to precise arrangements and instrumentalities shown.

DETAILED DESCRIPTION OF THE PREFERRED EMBODIMENT

Figure 1:
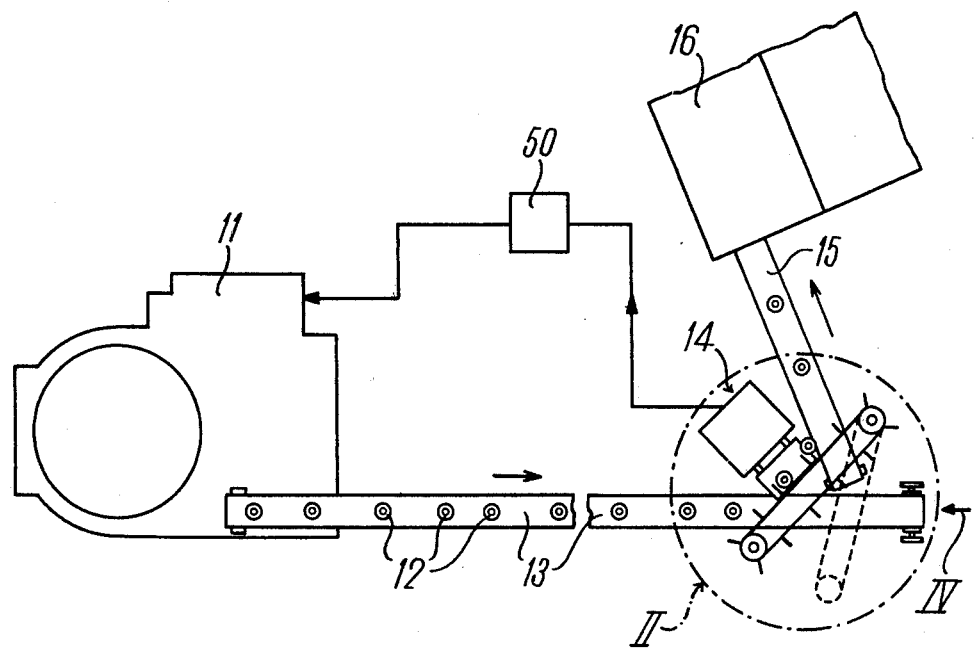
FIG. 1 is a schematic top view of an automatic glass blowing machine and its conveyor apparatus to a cooling oven, with an apparatus according to the present invention interposed therewith.

With reference to FIG. 1, an automatic glass blowing machine 11 is schematically presented, in which products 12, for example, glass bottles or other containers, are blown out of a liquid glass mass. The products 12 leave the automatic glass blowing machine 11 on a conveyor belt, which is the delivery conveyor belt 13 of a weighing apparatus generally indicated with the reference symbol 14. The weighing apparatus 14, which will be more specifically described in the following in connection with FIG. 2, is arranged at the point of transfer placed between the delivery conveyor belt 13 and a removal conveyor belt 15 and which is at an acute angle to it; the removal conveyor belt 15 leads into a cooling oven 16.

The angle between the two conveyor belts 13 and 15 can be as desired and does not have to be an acute angle. It results from the spacial relationships; that is, the respective arrangements of automatic glass blowing machine 11 and cooling oven 16. It ought to be considered that usually the side of the apparatus which, as seen from the automatic glass blowing machine 11, lies on the right of the removal conveyor belt 15, must be, for operational reasons, very accessible, whereas the space between the automatic glass blowing machine 11 and the cooling oven 16 is unused.

Figure 2:
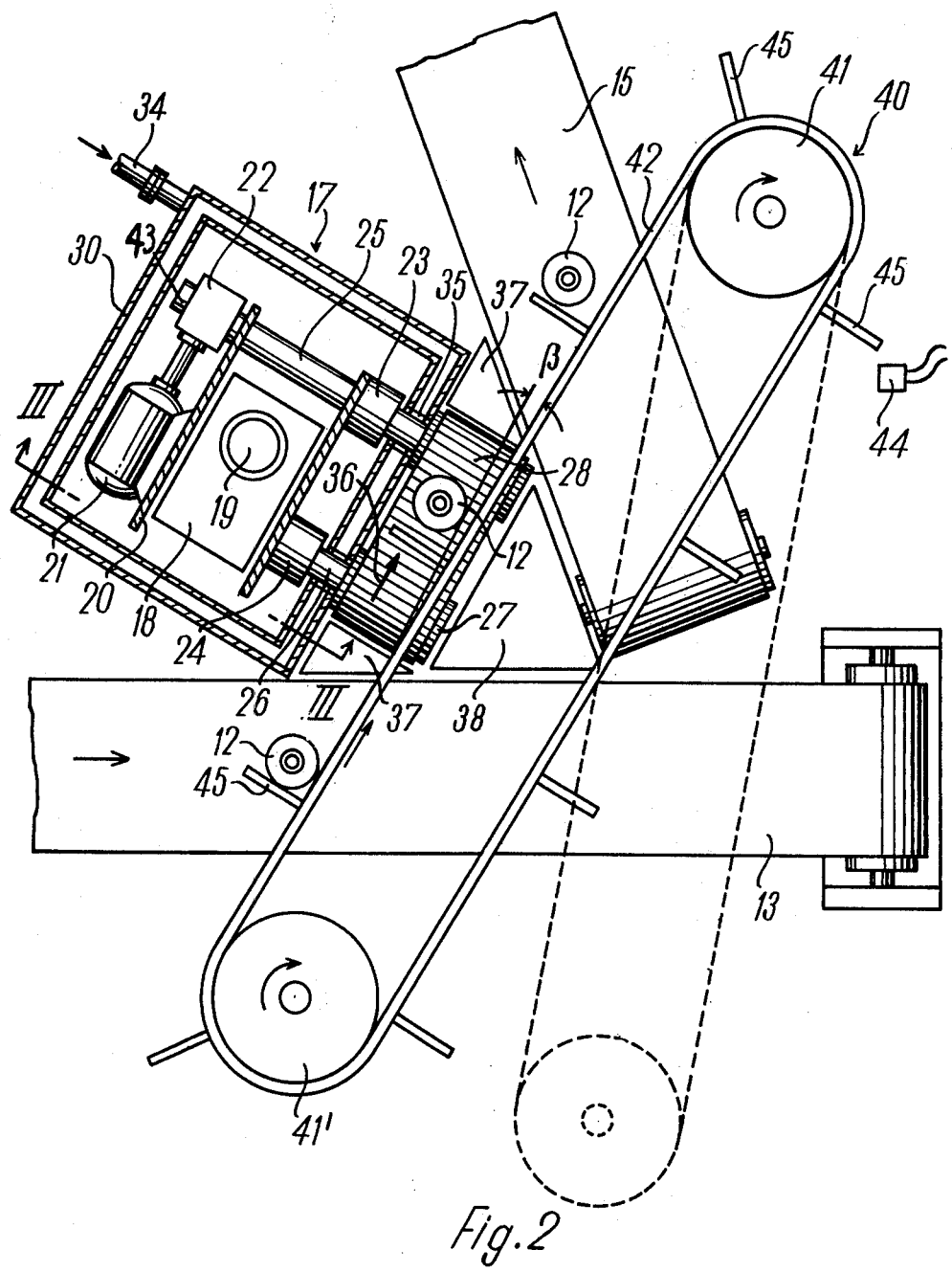
FIG. 2 shows an enlarged top view with respect to FIG. 1 of the detail marked II, shown in FIG. 1.

In FIG. 2, the details of the weighing apparatus 14 can be better recognized. In this case, in the acute angle formed between the conveyor belts 13 and 15, a weighing device 17 is arranged which has, as its core, a weighing cell 18, which is an ordinary closed compartment that converts a weight placed on its upper weighing piston 19 into an electrical weighing signal.

Figure 3:
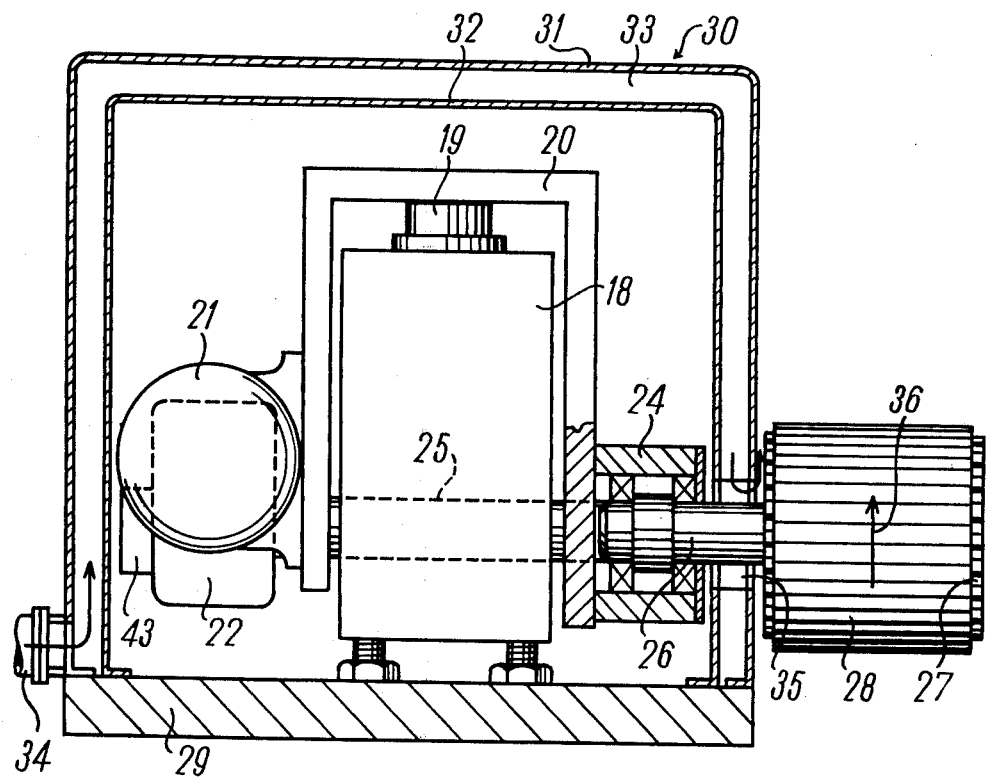
FIG. 3 shows a section through a weighing device taken along line III—III in FIG. 2.

In FIG. 3, one can recognize that a U-shaped bridge 20, as seen from the side view, is mounted on the piston 19. The top U-arch stretches over the weighing cell 18. One lateral leg of the arch supports a driving motor 21 and a stationary angle gear 22 standing in combination with this, while the other leg supports two bushings 23 and 24 for the two shafts 25 and 26.

The shaft 25 goes through both legs of the bridge 20, and is supported on its one side in the gear 22 and driven by it. It projects beyond the bushing 23 and carries on this end a cylinder-like cog wheel 27, that forms one of the turning rollers of a weighing belt 28. This turning roller is made of metal like a chain belt to be able to withstand high temperatures. The two free tracks of the weighing belt 28 run horizontally. The second turning roll is also constructed like a cog wheel 27 which is supported on the floating shaft 26. The weighing belt 28 can also consist of two or more small chains arranged in parallel intervals.

The parts of the weighing apparatus 14 arranged on a foundation plate 29 are enclosed by a housing 30 with the exception of the weighing belt 28. The housing consists of two hoods 31 and 32 which are separated from each other and between which is constructed a hallow space 33. One of these hoods can be provided with a heat insulation. The hollow space 33 is connected to an air intake 34, through which cool air is blown through the hollow space between the two hoods 31 and 32. This air goes out preferably in the area of the exit path openings 35, after it has been circulated around through corresponding conduction paths especially for the cooling of the side facing toward the weighing belt 28 of which the shafts 25 and 26 project through the housing 30 at the exit path openings toward the outside in order to support the weighing belt 28, which is pivoted loosely, outside the housing 30. In this way (i.e. air going out the shafts projecting) the entrance of dirt is hindered at this one weak point in the housing 30 and a cooling of the weighing belt 28 is brought about. By means of a corresponding ventilation of the inner space, the motor heat which is generated can also be removed.

It can be seen from FIG. 2 that the weighing device 17 is so arranged, that the weighing belt 28 points into the angle between the two conveyor belts 13 and 15. It is arranged with its middle axis just about in the bisection of the angle. The conveying direction of the weighing belt 28, which is indicated by the arrow 36, runs from the delivery conveyor 13 to the removal conveyor 15. The triangular spaces between the conveyor belts 13 and 15 and the weighing belt 28 are filled by the transfer plates 37. Also the triangular space between the two conveyors 13 and 15 and the weighing belt 28 is occupied by a transfer plate 38.

A transfer conveyor 40 in the form of a finger-chain conveyor which runs around the vertical turning rollers 41 and 41' extends over the delivery conveyor belt 13, the weighing belt 28, and the removal conveyor belt 15. Its track 42, which is turned toward the weighing belt 28, runs with respect to the conveyor direction 36 of the weighing belt 28, at a small angle B, such that the running direction of the track 42 and the conveyor direction diverge at the angle B. The driving of the weighing belt 28 is monitored with respect to its number of revolutions by a first tachogenerator 43 seen in FIG. 3 and this number of revolutions is synchronized also with the speed of the drive of the transfer conveyor 40 which is monitored by a second tachogenerator that is not shown. This synchronization is such that the weighing belt 28 has a higher speed than the transfer conveyor 40 by a constant factor. A signal source 44 arranged at any position in the area of the path of revolution of the transfer conveyor 40 is executed as a contact-less feeler for the purpose of operating together with the fingers 45 of the finger-chain conveyor or with other parts which are placed in the intervals between the fingers on the finger-chain conveyor.

The weighing apparatus works as follows: The products 12 which have been produced by the automatic glass blowing machine 11 and placed onto the delivery conveyor belt 13, and run toward the track 42 of the transfer conveyor 40 and because it revolves clockwise, are caught by the fingers 45 and pushed over the first transfer plate 37 onto the weighing belt 28. Thereby, as can be seen in the lower part of FIG. 2, the products rest against the finger 45 as well as on the track 42.

Since they are driven by it, they are conveyed in the transfer conveyor direction 36, when they come onto the weighing belt 28. As a consequence of the fact that the speed of the weighing belt 28 is somewhat faster than that of the transfer conveyor 40, the products move a little ahead of the finger 45. At the same time they move away from the track 42 because of the divergence between the transport direction 36 and the direction of the track at the angle B. Therefore, the product 12 stands free on the weighing belt 28 shortly after its arrival thereon so that no falsification of the weighing result can occur. The weight of the bridge 20, which has been increased by the weight of the product 12, affects correspondingly the weighing cell 18, which because of its built-in damping device undertakes a quick transient to the correct weight. Shortly before the product 12 has run the full length of the weighing belt 28, one of the fingers 45 of the transfer conveyor goes past the signal initiator 44 and thereby releases a call-off impulse for the weighing signal. In this moment, therefore, the momentary value of the electrical weighing signal of the weighing cell 18 is taken and shown or analyzed. In the process, indeed, a weighing signal is released, when no product is on the weighing belt 28, but it is simple to eliminate the resulting weighing signal "0" by the determination of an average value.

When the product 12 is transported from the weighing belt 28 to the adjoining transfer plate 37, it becomes slower because it is no longer transported by the weighing belt 28; for this reason, it is caught by a finger 45 again, which shoves it over the transfer plate 37 onto the removal conveyor belt 15, on which the product then goes into the cooling oven 16.

Whereas the conveyor belts 13 and 15 and the weighing belt 28 as well as the transfer conveyor 40 can be executed to be sufficiently sturdy and resistant to temperature, as were the construction parts tested in practice, so as to be able to stand up against the extraordinarily high temperatures and the dirt which is generated, this is not the case with the sensitive weighing cell 18, the electro-motor 21 and the support bushings 23 and 24 for the shafts 25 and 26 of the weighing belt 28. These are, however, enclosed in the housing 30 and are thereby protected from dirt and air turbulence, as well as protected from the heat by an air-cooled double wall. As already mentioned, air is led into the double wall through the nozzle 34 and goes out by way of the openings 35. Thereby, the heat conduction over the shafts 25 and 26 is also lessened.

The weighing apparatus 14 stands, in the arrangement shown, in a place which is not usable in the operation anyway, and can therefore be constructed sufficiently sturdily and enclosed with a housing 30 for which nothing need be spared on the dimensions. The transfer of the articles 12 from the delivery conveyor belt 13 onto the removal conveyor belt 15 which is necessary anyhow, is neither disturbed nor complicated by the weighing process. If it should happen that a malfunction of the weighing device does occur or that a weighing is not necessary at the moment, then the weighing belt 28 can be eliminated from the path of the transfer by means of a pivoting of the transfer conveyor 40 around the axis of the turning roller 41. This position is represented in FIGS. 1 and 2 by dotted lines. It is also to be recognized that in the process, the products 12 are pushed from the delivery conveyor belt 13 to the transfer plate 38 and from this directly, that is while the weighing belt 28 is bypassed, onto the removal conveyor belt 15.

Figure 4:
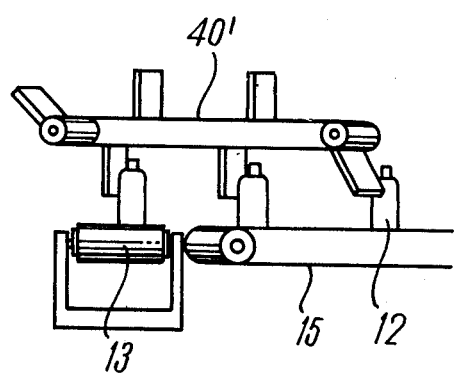
FIG. 4 is a schematic view seen in the direction of the arrown IV in FIG. 1, but with an alternate position of operation of the transfer conveyor shown.

This device is also advantageous when occasional spot checks are to be made with the weighing device. In the example presented, the products 12 arrive on the delivery conveyor 13 in a single file. When in the case of a correspondingly executed manufacturing machine, two rows next to each other arrive, it will be necessary to shift the device as shown and described. Then it can be advantageous to provide, in addition to the transfer conveyor 40, another similarly constructed transfer conveyor whose turning rollers 41 rotate around horizontal axes. Such a device is indicated in FIG. 4. The transfer conveyor 40 shown there can, under certain conditions, be also provided alone or there can be two transfer conveyors of this kind running parallel. The fingers catch from above in this case. The use of two separate weighing belts is also possible.

In the usage of the weighing device with an automatic glass blowing machine 11 as described, the weighing signal is the entrance signal for a regulating device 50 that, as is indicated in FIG. 1, affects the automatic glass blowing machine 11 such that it regulates the feed-in elements for the glass to the individual blowing molds as a function of the weight of the products 12. By this means, it is possible, by way of the weight of the manufactured containers, to keep the capacity and the thickness of their walls precisely constant, and by this means the thickness of the walls can be reduced to the necessary minimum thus saving material. It is also possible to be able to sell to the consumer of the product in the containers in exact proportion. One should also note that the bridge 20 occupies a very stable position as shown in FIG. 3, by the arrangement of the weighing belt 28 and of the motor 21 below the point of support of the bridge 20 on the piston 19.

Furthermore, it is a great advantage that the fingers 45 of the transfer conveyor 40 are each in contact with the product 12 only a very short time and no longer touch them during the weighing procedure. This way they have sufficient time to cool down further; for that reason it becomes possible to provide them with a coating, which avoids change blemishes or reduces them to a minimum. Further, the free-supporting bushing of the weighing belt 28 makes easily possible its changing or repair. It is a further advantage that due to the excellent guidance of the products onto the transfer plates, a weighing belt of relatively large diameter can be chosen, which improves the smoothness of the weighing belt's operation. By eliminating all wobbling tendencies of the products with such a large diameter weighing belt, the weighing results are thereby improved. The invention is especially advantageously mountable in the described possible application in glass manufacturing. It is, however, in comparable circumstances, always usable when products which are transported on belts must be weighed and of great advantage when these products or their method of production, have a high temperature, create a great amount of dirt or produce in other ways, harmful and insufferable environmental conditions for weighing devices.

The present invention may be embodied in other specific forms without departing from the spirit or essential attributes thereof, and, accordingly, reference should be made to the appended claims, rather than to the foregoing specification as indicating the scope of the invention.

I claim:

1. Apparatus for weighing mass produced articles shortly after formation of said articles, comprising:
   a weighing cell for measuring the weight of each of said articles;
   a continuously moving weighing belt, supported by and connected to said weighing cell, for supporting each of said articles when weighed;
   a delivery conveyor belt for continuously transporting said articles to said weighing belt;
   a removal conveyor belt for continuously transferring said articles away from said weighing belt, running at an angle to said delivery conveyor belt, said weighing cell being interposed in the space formed by said angle; and
   means extending over said delivery conveyor belt, said removal conveyor belt and said weighing belt for transferring said articles from said delivery conveyor belt to said weighing belt and from said weighing belt to said removal conveyor belt, said transfer means having at least one finger member, and said weighing belt moving faster than said transfer means, thereby separating said articles from said transfer means.

2. The apparatus of claim 1, wherein said transfer means is at least one finger-chain conveyor belt.

3. The apparatus of claim 2, wherein said at least one finger-chain conveyor belt has a vertical turning axis.

4. The apparatus of claim 2, wherein said at least one finger-chain conveyor belt has a horizontal turning axis.

5. The apparatus of claim 3, further comprising a transfer element interposed between said delivery conveyor belt, said removal conveyor belt and said weighing belt, for transporting said articles directly from said delivery conveyor belt to said removal conveyor belt when said finger-chain conveyor belt is moved about said vertical turning axis.

6. The apparatus of claim 1, wherein the direction of motion of said weighing belt is at a divergent angle to the direction of motion of said transfer means.

7. The apparatus of claim 1, wherein said transfer means further comprise a signal initiator for producing command impulses directed to said weighing cell.

8. The apparatus of claim 1, wherein said weighing belt runs on floating shafts supported by said weighing cell.

9. The apparatus of claim 1, further comprising a bridge-like support resting on the top of said weighing cell, said weighing belt attached to one side of said bridge-like support and means for driving said weighing belt attached to the opposite side of said bridge-like support from said weighing belt.

10. The apparatus of claim 9, wherein the center of gravity of a mechanical system comprising said bridge-like support, said weighing belt and said driving means lies below its said resting point of said weighing cell.

11. The apparatus of claim 1, further comprising a rotation measuring device and a regulating device, each connected to said weighing belt and said transfer means, for maintaining a constant speed differential between said weighing belt and said transfer means.

12. The apparatus of claim 1, further comprising a closed housing surrounding said weighing apparatus, out of which said weighing belt projects.

13. The apparatus of claim 12, wherein said housing is insulated.

14. The apparatus of claim 13, wherein said housing has a positive pressure ventilation.

15. The apparatus of claim 14, wherein said housing has at least partial double wall construction, and said positive pressure ventilation is directed through the space between said double walls.

16. The apparatus of claim 15, wherein the exhaust of said positive pressure ventilation from said housing is formed at said point of projection of said weighing belt through said housing.

17. Apparatus for weighing articles mass produced in an automatic glass blowing machine having an exit conveyor belt from said machine and an entrance conveyor belt to an appropriate cooling chamber, said entrance conveyor belt running at an angle to said delivery belt, comprising:
- a weighing cell for measuring the weight of each of said articles, interposed in the space formed by said angle between said exit conveyor belt and said entrance conveyor belt;
- a continously running weighing belt, supported by and connected to said weighing cell, for supporting said articles being weighed; and,
- transfer means extending over said exit conveyor belt, said entrance conveyor belt and said weighing belt, for moving said articles from said exit conveyor belt to said weighing belt and from said weighing belt to said entrance conveyor belt, said transfer means having at least one finger member, and said weighing belt moving faster than said transfer means, thereby separating said articles from said transfer means.

* * * * *